United States Patent
Todderud et al.

(10) Patent No.: US 12,471,533 B2
(45) Date of Patent: Nov. 18, 2025

(54) CLEANING ASSEMBLY FOR AN AUGER OF AN AGRICULTURAL HEADER

(71) Applicants: CNH Industrial America LLC, New Holland, PA (US); CNH Industrial Brasil Ltda., Nova Lima (BR)

(72) Inventors: Stephen Todderud, Lancaster, PA (US); Renato Alves Ribeiro Junior, Curitiba (BR); Laercio Flis, Curitiba (BR)

(73) Assignees: CNH Industrial America LLC, New Holland, PA (US); CNH Industrial Brasil Ltda., Nova Lima (BR)

( * ) Notice: Subject to any disclaimer, the term of this patent is extended or adjusted under 35 U.S.C. 154(b) by 454 days.

(21) Appl. No.: 18/114,786

(22) Filed: Feb. 27, 2023

(65) Prior Publication Data
US 2024/0284832 A1    Aug. 29, 2024

(51) Int. Cl.
*A01D 75/02*  (2006.01)
*A01D 41/06*  (2006.01)
*A01D 75/18*  (2006.01)

(52) U.S. Cl.
CPC .......... *A01D 75/187* (2013.01); *A01D 41/06* (2013.01)

(58) Field of Classification Search
CPC .............................. A01D 75/187; A01D 41/06
See application file for complete search history.

(56) References Cited

U.S. PATENT DOCUMENTS

| | | | |
|---|---|---|---|
| 3,669,125 A * | 6/1972 | Rowland-Hill | A01F 12/52 460/13 |
| 3,971,195 A * | 7/1976 | Rowland-Hill | A01D 41/14 460/70 |
| 4,583,903 A * | 4/1986 | Hutchison | B65G 65/466 414/311 |
| 8,056,314 B1 | 11/2011 | Anstey et al. | |
| 8,826,816 B2 | 9/2014 | Vergote | |
| 10,524,424 B2 | 1/2020 | Seo | |
| 10,806,083 B2 | 10/2020 | Baldini | |
| 11,375,668 B2 * | 7/2022 | Horst | A01F 12/52 |
| 2008/0295474 A1 * | 12/2008 | Tippery | A01D 57/20 56/153 |
| 2013/0160416 A1 * | 6/2013 | Bollig | A01D 45/021 56/119 |
| 2021/0100168 A1 * | 4/2021 | Robison | B65G 65/22 |

FOREIGN PATENT DOCUMENTS

| | | | | |
|---|---|---|---|---|
| CN | 109429685 A | * | 3/2019 | ......... A01D 41/1217 |
| CN | 210094007 U | * | 2/2020 | |
| DE | 102014009468 A1 | * | 12/2015 | ........... A01D 61/008 |

(Continued)

OTHER PUBLICATIONS

English Translation of CN-210094007-U (Year: 2020).*
(Continued)

*Primary Examiner* — Claude J Brown
(74) *Attorney, Agent, or Firm* — Fletcher Yoder, P.C.

(57) ABSTRACT

A cleaning assembly for an auger of an agricultural header includes at least one lug configured to extend axially outwardly beyond an axial end of a shaft of the auger. The at least one lug is configured to engage crop material positioned between the axial end of the shaft and a shield and to move the crop material toward a flighting of the auger.

20 Claims, 6 Drawing Sheets

(56) References Cited

FOREIGN PATENT DOCUMENTS

| | | | | |
|---|---|---|---|---|
| EP | 0065416 A1 | * | 11/1982 | ............. A01D 82/00 |
| JP | 3817285 B2 | * | 9/2006 | |
| JP | 2009074789 A | * | 4/2009 | |

OTHER PUBLICATIONS

English Translation of JP-2009074789-A (Year: 2009).*
English Translation of CN-109429685-A (Year: 2019).*
English Translation of JP-3817285-B2 (Year: 2006).*
English Translation of DE-102014009468-A1 (Year: 2015).*

* cited by examiner

CLEANING ASSEMBLY FOR AN AUGER OF AN AGRICULTURAL HEADER

BACKGROUND

The present disclosure relates generally to a cleaning assembly for an auger of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing agricultural crops from a field, such as by using a header. The header may cut the agricultural crops and transport the resulting crop material to a processing system of the combine.

Certain headers include a cutter bar assembly configured to cut a portion of each crop (e.g., a stalk), thereby separating the crop material from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the crop material to an auger, which moves the crop material toward an inlet of the processing system. Certain headers include a reel assembly configured to direct the crop material from the cutter bar assembly toward the belt(s), thereby substantially reducing the possibility of the crop material falling onto the surface of the field.

The auger of the header is positioned downstream from the belt(s) and configured to move the crop material toward the processing system via rotation of the auger. Certain augers include a shaft and a flighting extending radially outwardly from the shaft. The shaft may be driven to rotate by one or more motors, thereby driving the flighting to rotate. The flighting engages the crop material and moves the crop material toward the processing system. Unfortunately, during operation of the auger, crop material may buildup within a gap between an axial end of the shaft and a shield positioned adjacent to the axial end. The buildup may interfere with movement of the crop material toward the processing system, thereby reducing the effectiveness of the harvesting operation.

SUMMARY

In certain embodiments, a cleaning assembly for an auger of an agricultural header includes at least one lug configured to extend axially outwardly beyond an axial end of a shaft of the auger. The at least one lug is configured to engage crop material positioned between the axial end of the shaft and a shield and to move the crop material toward a flighting of the auger.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
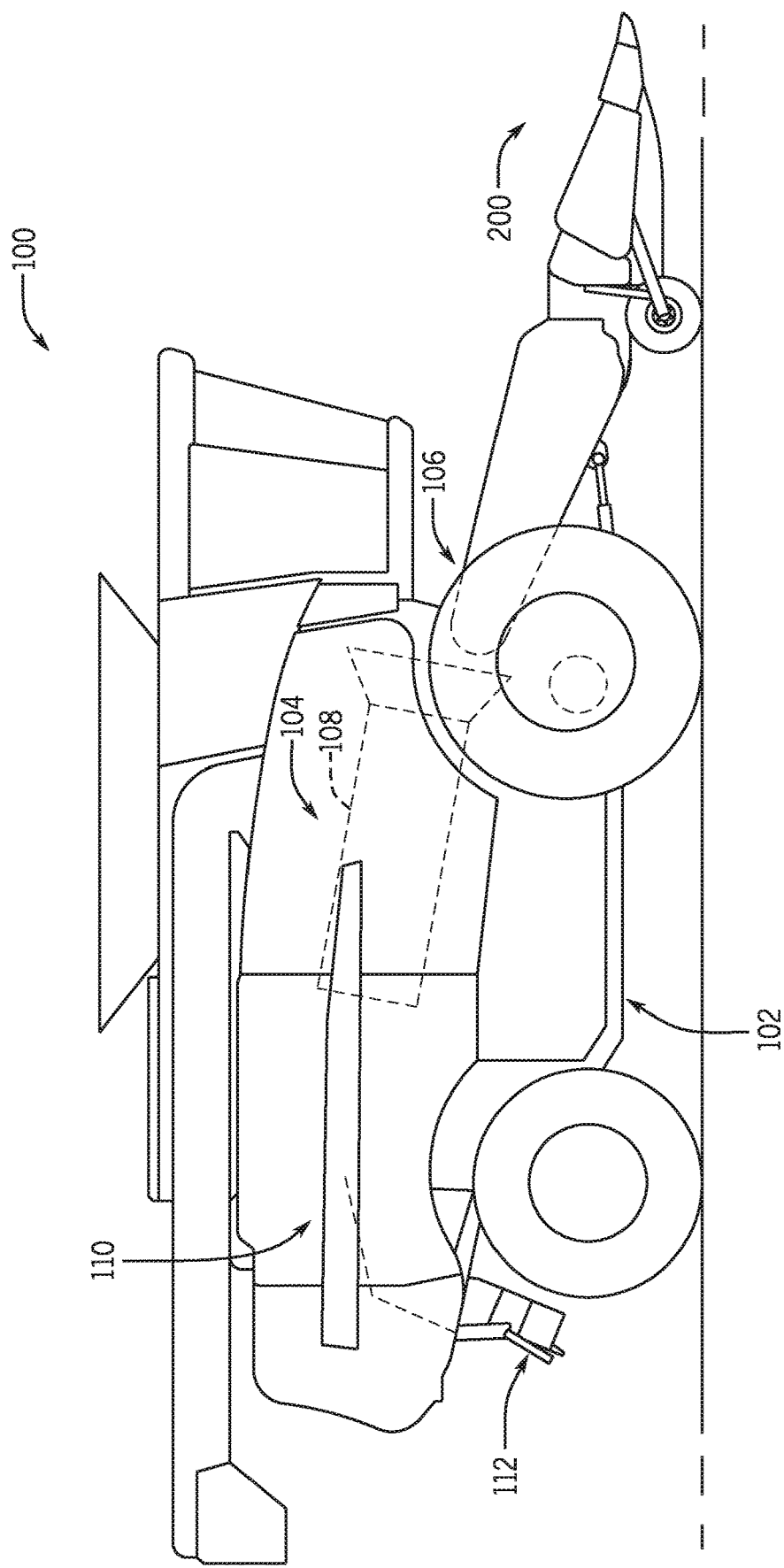
FIG. 1 is a side view of an embodiment of an agricultural harvester having a header.

FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the resulting crop material (e.g., cut crops) toward an inlet 106 of the agricultural crop processing system 104 for further processing of the crop material. The agricultural crop processing system 104 receives crop material from the header 200 and separates desired crop material from crop residue. For example, the agricultural crop processing system 104 may include a thresher 108 having a cylindrical threshing rotor that transports the crop material in a helical flow path through the harvester 100. In addition to transporting the crop material, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. In certain embodiments, the header 200 also includes a reel assembly configured to urge crop material from the cutter bar assembly to belts that convey the crop material toward the inlet 106 of the agricultural crop processing system 104. Furthermore, the header 200 includes an auger positioned downstream from the belts and configured to move the crop material toward the agricultural crop processing system via rotation of the auger. The auger includes a shaft and a flighting extending radially outwardly from the shaft. The auger may be driven to rotate by one or more motors, thereby driving the flighting to rotate. The flighting engages the crop material and moves the crop material toward the agricultural crop processing system.

In certain embodiments, the auger includes a cleaning assembly configured to substantially reduce accumulation of crop material within a gap between an axial end of the shaft and a shield positioned adjacent to the axial end. The cleaning assembly includes one or more lugs extending axially outwardly beyond the axial end of the shaft. The lug(s) are configured to engage crop material positioned between the axial end of the shaft and the shield and to move the crop material toward the flighting. The flighting then moves the crop material toward the agricultural crop processing system, as discussed above. Accordingly, buildup of crop material within the gap may be substantially reduced, thereby facilitating movement of the crop material toward the agricultural crop processing system. As a result, the effectiveness of the harvesting operation may be enhanced.

Figure 2:
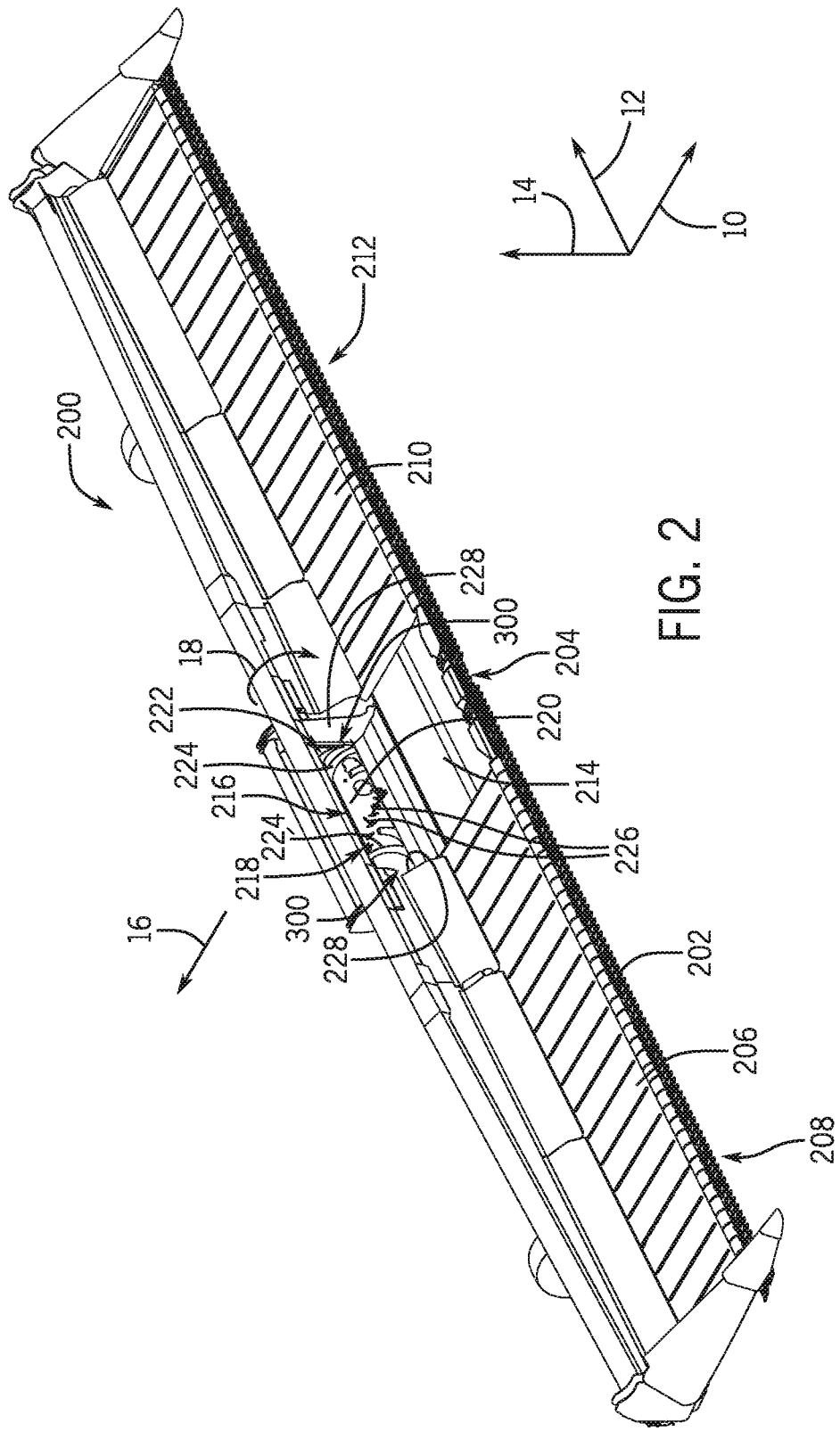
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly includes a blade support, a stationary guard assembly, and a moving blade assembly. The moving blade assembly is fixed to the blade support (e.g., above the blade support with respect to a vertical axis 14 of the header 200), and the blade support/moving blade assembly is driven to oscillate relative to the stationary guard assembly. In the illustrated embodiment, the blade support/moving blade assembly is driven to oscillate by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side 208 of the header 200 and a second lateral belt 210 on a second lateral side 212 of the header 200, opposite the first lateral side 208. Each belt is driven to rotate by a suitable drive mechanism, such as an electric motor or a hydraulic motor. The first lateral belt 206 and the second lateral belt 210 are driven such that the top surface of each belt moves laterally inward. In addition, the header 200 includes a longitudinal belt 214 positioned between the first lateral belt 206 and the second lateral belt 210 with respect to the lateral axis 12. The longitudinal belt 214 is driven to rotate by a suitable drive mechanism, such as an electric motor or a hydraulic motor. The longitudinal belt 214 is driven such that the top surface of the longitudinal belt 214 moves rearwardly with respect to the longitudinal axis 10.

In certain embodiments, the crop material (e.g., cut crops) cut by the cutter bar assembly 202 are directed toward the belts by a reel assembly, thereby substantially reducing the possibility of the crop material falling onto the surface of the field. The reel assembly may include a reel having multiple tines. The reel assembly may also include a rotating structure that is driven to rotate (e.g., by one or more electric motors, by one or more hydraulic motors, etc.). Furthermore, the reel may include multiple bat tubes rotatably coupled to the rotating structure, and a respective set of tines may be coupled to each bat tube. The reel assembly may include tine rotation mechanism(s) (e.g., cam and follower assembly/assemblies or parallel state assembly/assemblies). Each tine rotation mechanism is configured to drive the bat tubes to rotate relative to the rotating structure (e.g., in response to rotation of the rotating structure). Accordingly, the tines rotate in a first pattern (e.g., circular pattern) about the rotational axis of the rotating structure and in second patterns (e.g., circular patterns or oscillating patterns) about the rotational axes of respective bat tubes. The tines are configured to engage the crop material and to urge the crop material to move toward the belts. The crop material that contacts the top surface of each lateral belt is driven laterally inwardly to the longitudinal belt due to the movement of the lateral belt. In addition, the crop material that contacts the longitudinal belt 214 and the crop material provided to the longitudinal belt by the lateral belts is driven rearwardly with respect to the longitudinal axis 10 (e.g., along a rearward direction 16) due to the movement of the longitudinal belt 214.

In the illustrated embodiment, the header 200 includes an auger 216 positioned downstream from the belts and configured to move the crop material toward the agricultural crop processing system via rotation of the auger 216. As illustrated, the auger 216 is positioned rearward of the longitudinal belt 214 with respect to the longitudinal axis 10 (e.g., along the rearward direction 16) and within an opening 218 in the header 200. Accordingly, the auger 216 receives the crop material from the longitudinal belt 214 and moves the crop material along the rearward direction 16 through the opening 218 and toward the inlet of the agricultural crop processing system.

In the illustrated embodiment, the auger 216 includes a shaft 220 and a flighting 222 extending radially outwardly from the shaft 220. The flighting 222 may include any suitable element(s) configured to engage the crop material and to move the crop material toward the agricultural crop processing system via rotation of the auger 216. For example, the flighting 222 may include spiral blade(s), protrusion(s), plate(s), other suitable element(s), or a combination thereof. In the illustrated embodiment, the flighting 222 includes a spiral blade 224 positioned at each laterally outward portion of the auger 216, and the flighting 222 includes protrusions 226 positioned at the laterally inward portion of the auger 216. As the auger rotates in a rotational direction 18, the spiral blades 224 move the crop material laterally inward, and the protrusions 226 move the crop material along the rearward direction 16 toward the inlet of the agricultural crop processing system. While the flighting includes two spiral blades 224 and multiple protrusions 226 in the illustrated embodiment, in other embodiments, the flighting may include more or fewer spiral blades (e.g., 0, 1, 3, 4, or more), more or fewer protrusions (e.g., including no protrusions), other suitable element(s), or a combination thereof. The auger 216 may be driven to rotate in the rotational direction 18 by one or more motors (e.g., electric motor(s), pneumatic motor(s), hydraulic motor(s), etc.), thereby driving the flighting 222 to rotate.

In the illustrated embodiment, the header 200 includes shields 228 positioned on opposite lateral sides of the auger 216 and configured to direct the crop material toward the auger 216. To facilitate rotation of the auger 216, each axial end of the shaft 220 is spaced apart from a respective shield 228 with respect to the lateral axis 12, thereby establishing a gap between each axial end of the shaft 220 and the respective shield 228. In the illustrated embodiment, the auger 216 includes cleaning assemblies 300, and each cleaning assembly 300 is configured to substantially reduce accumulation of crop material within a respective gap. A first cleaning assembly 300 is positioned at a first gap on a first axial side (e.g., lateral side) of the auger shaft 220, and a second cleaning assembly 300 is positioned at a second gap on a second axial side (e.g., lateral side) of the auger shaft 220, opposite the first axial side. While the auger 216 includes two cleaning assemblies 300 (e.g., one cleaning assembly for each gap) in the illustrated embodiment, in other embodiments, the auger may include a single cleaning assembly (e.g., positioned at one of the gaps).

As discussed in detail below, each cleaning assembly 300 includes one or more lugs extending axially outwardly beyond the respective axial end of the shaft 220. The lug(s) are configured to engage crop material positioned within the respective gap (e.g., between the respective axial end of the shaft 220 and the respective shield 228) and to move the crop material toward the flighting 222. As previously discussed, the flighting 222 moves the crop material toward the inlet of the agricultural crop processing system. Accordingly, buildup of crop material within each gap may be substantially reduced, thereby facilitating movement of the crop material toward the agricultural crop processing system. As a result, the effectiveness of the harvesting operation may be enhanced. While the cleaning assembly 300 is disclosed herein with regard to a header having belt(s) configured to move the crop material toward the inlet of the agricultural crop processing system, the cleaning assembly may be employed within a header having an auger and no belts (e.g., auger header, grain header, etc.).

Figure 3:
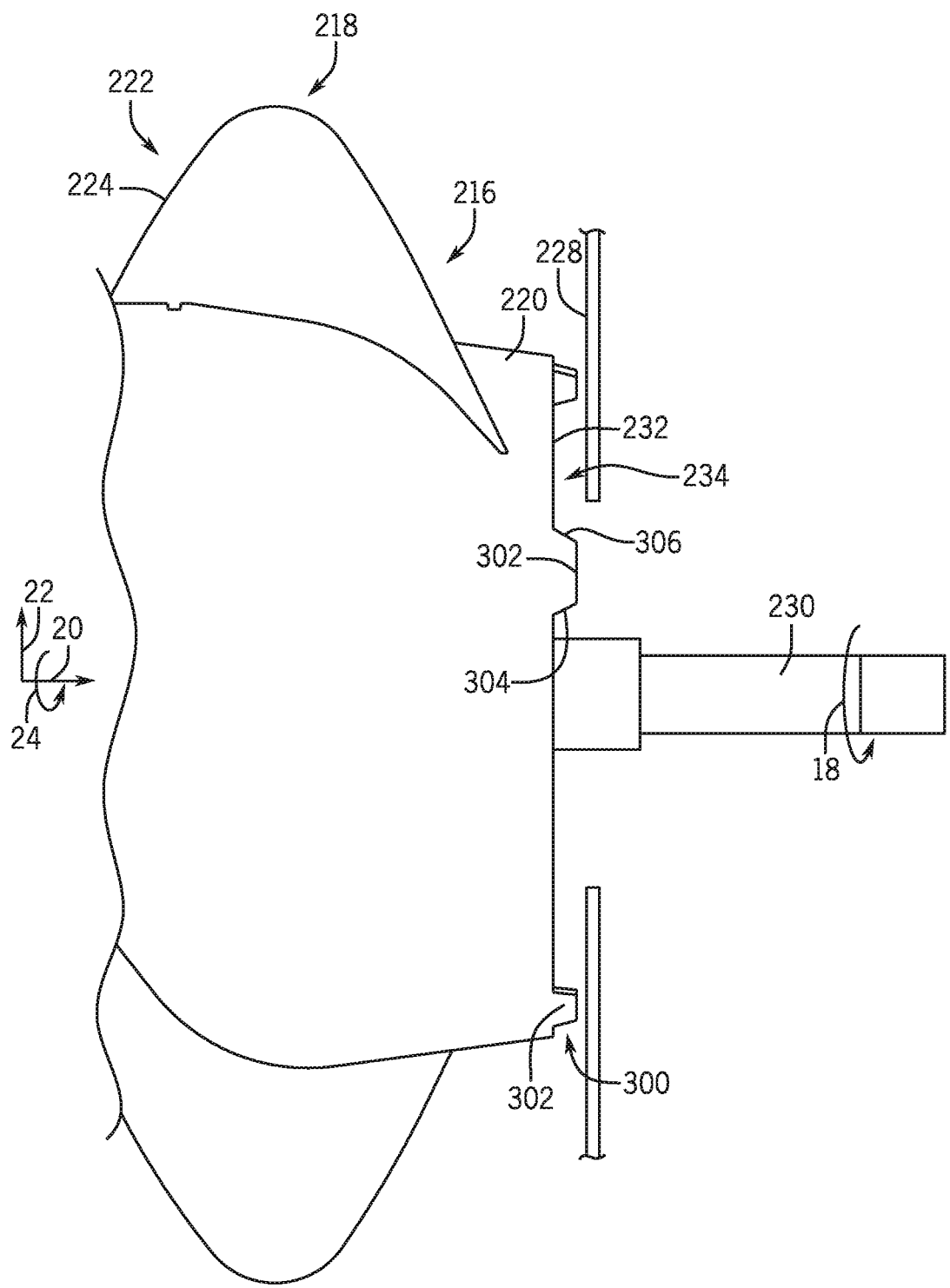
FIG. 3 is a front view of a portion of an embodiment of an auger that may be employed within the header of FIG. 2, in which the auger has an embodiment of a cleaning assembly.

FIG. 3 is a front view of a portion of an embodiment of an auger 216 that may be employed within the header of FIG. 2, in which the auger 216 has an embodiment of a cleaning assembly 300. The auger 216 is discussed herein with regard to an axial axis 20 (e.g., corresponding to a rotational axis of the auger 216), a radial axis 22, and a circumferential axis 24. In certain embodiments, the axial axis 20 of the auger 216 is aligned with the lateral axis of the header. As previously discussed, the auger 216 includes a shaft 220 and flighting 222 extending radially outwardly from the shaft 220 (e.g., outwardly from the shaft 220 with respect to the radial axis 22). The flighting 222 may include any suitable elements configured to move crop material in response to rotation of the auger 216, such as the illustrated spiral blades 224. Furthermore, as previously discussed, the auger 216 may be driven to rotate in the rotational direction 18 by one or more motors (e.g., electric motor(s), pneumatic motor(s), hydraulic motor(s), etc.), thereby driving the flighting 222 to rotate. In the illustrated embodiment, the auger 216 includes a drive shaft 230 coupled (e.g., non-rotatably coupled) to the shaft 220. The drive shaft 230 may be coupled to shaft(s) of the motor(s), thereby enabling the motor(s) to drive the shaft 220 to rotate. While the auger 216 is driven to rotate by the drive shaft 230 in the illustrated embodiment, in other embodiments, the auger may be driven to rotate by a chain, a belt, or another suitable device. Furthermore, while utilizing motor(s) to drive the auger to rotate is disclosed above, in certain embodiments, the auger may be driven to rotate by another suitable drive system, such as a power take-off system, a ground engaging wheel mechanically coupled to the auger, etc.

Furthermore, as previously discussed, the axial end 232 of the shaft 220 of the auger 216 is spaced apart from a respective shield 228 with respect to the axial axis 20, thereby establishing a gap 234 between the axial end 232 of the shaft 220 and the respective shield 228. The gap 234 facilitates rotation of the auger 216 relative to the shield 228 by substantially reducing or eliminating the possibility of contact between the auger 216 and the shield 228. During operation of the auger 216, crop material may enter the gap 234. Accordingly, the auger 216 includes a cleaning assembly 300 configured to remove crop material from the gap 234, thereby substantially reducing accumulation of crop material within the gap 234.

In the illustrated embodiment, the cleaning assembly 300 includes lugs 302 extending axially outwardly (e.g., with respect to the axial axis 20) beyond the axial end 232 of the shaft 220. The lugs 302 are distributed about a circumferential extent of the shaft 220 (e.g., about the shaft 220 with respect to the circumferential axis 24). The lugs 302 are configured to engage crop material positioned within the gap 234 and to move the crop material toward the flighting 222. For example, as the auger 216 is rotating, a stem or leaf of the crop material may enter the gap 234. One of the lugs 302 may contact the stem/leaf, thereby applying a force and a moment to the stem/leaf due to the movement of the lug with respect to the circumferential axis 24. The force may drive the stem/leaf to translate out of the gap 234 (e.g., translational movement), and the moment may cause the stem/leaf to rotate (e.g., rotational movement). Due to the proximity of the flighting 222 to the axial end 232 of the shaft 220, the translational and rotational movement of the stem/leaf may cause the stem/leaf to engage the flighting 222. The flighting 222, in turn, moves the crop material (e.g., stem/leaf) toward the inlet of the agricultural crop processing system as the auger 216 rotates in the rotational direction 18. Accordingly, buildup of crop material within the gap 234 may be substantially reduced, thereby facilitating movement of the crop material toward the agricultural crop processing system. As a result, the effectiveness of the harvesting operation may be enhanced.

In the illustrated embodiment, the cleaning assembly 300 includes four lugs 302. However, in other embodiments, the cleaning assembly may include more or fewer lugs (e.g., 1, 2, 3, 5, 6, 7, 8, or more). Furthermore, each lug 302 may have any suitable circumferential extent (e.g., extent with respect to the circumferential axis 24). In addition, in embodiments of the cleaning assembly having multiple lugs, any suitable circumferential spacing between the lugs may be employed. For example, the circumferential extent of each lug and/or the circumferential spacing between the lugs may be particularly selected to effectively move crop material having expected property/properties toward the flighting. The expected property/properties may include the type of crop material (e.g., based on the type of crops being harvested), the density of the crop material, the moisture content of the crop material, the thickness of the crop material, other suitable property/properties, or a combination thereof. Furthermore, the lugs 302 may have any suitable axial extent (e.g., extent with respect to the axial axis 20), thereby establishing a desired spacing between the lugs and the shield with respect to the axial axis. For example, the axial extent of each lug may be particularly selected to effectively move crop material having expected property/properties toward the flighting. In the illustrated embodiment, the circumferential extents of the lugs 302 are uniform (e.g., equal to one another), the circumferential spacings between the lugs 302 are uniform (e.g., equal to one another), and the axial extents of the lugs 302 are uniform (e.g., equal to one another). However, in other embodiments, at least two lugs may have different circumferential extents, at least two circumferential spacings between the lugs may be different, at least two lugs may have different axial extents, or a combination thereof.

In the illustrated embodiment, each lug 302 is integrally formed with the shaft 220. For example, the lugs 302 may be formed by a machining process, a casting process, an additive manufacturing process, or a combination thereof. However, in other embodiments, at least one lug may be formed separately from the shaft and coupled to the shaft by a suitable connection. For example, at least one lug may be coupled to the shaft by a welded connection, an adhesive connection, a fastener connection, a press-fit connection, other suitable type(s) of connection(s), or a combination thereof. In addition, in the illustrated embodiment, each lug 302 extends from the axial end 232 of the shaft 220. However, in other embodiments, at least one lug may extend axially along a surface (e.g., an outer surface or an inner surface) of the shaft and outwardly beyond the axial end of the shaft. Furthermore, in the illustrated embodiment, each lug 302 is separate from the flighting 222 (e.g., not directly coupled to the flighting 222). However, in other embodiments, at least one lug may be coupled to/integrally formed with at least a portion of the flighting (e.g., in addition to or instead of the lug(s) coupled to/integrally formed with the shaft), and such lug(s) may extend axially outwardly (e.g., with respect to the axial axis) beyond the axial end of the shaft.

In the illustrated embodiment, each lug 302 has a tapered profile. Furthermore, in the illustrated embodiment, the tapered profile includes an angled leading edge 304 and an angled trailing edge 306. The leading edge 304 of each lug 302 may be oriented at any suitable angle relative to the axial axis 20, and the trailing edge 306 of each lug 302 may be oriented at any suitable angle relative to the axial axis 20. In the illustrated embodiment, the leading edge 304 and the trailing edge 306 of each lug 302 are angled toward one another (e.g., toward a circumferential center of the lug 302). However, in other embodiments, with regard to at least one lug, the leading edge and the trailing edge may be angled away from one another (e.g., away from the circumferential center) of the lug, the leading edge may be angled toward the trailing edge and the trailing edge may be angled away from the leading edge, or the leading edge may be angled away from the trailing edge and the trailing edge may be angled toward the leading edge. Furthermore, in certain embodiments, with regard to at least one lug, at least one of the leading edge or the trailing edge may not be angled relative to the axial axis (e.g., the edge may be parallel to the axial axis). In certain embodiments, at least one lug may not have a tapered profile. For example, at least one lug may have a curved profile, at least one lug may have a rectangular profile, at least one lug may have another suitable profile, or a combination thereof. The profile of each lug may be particularly selected to effectively move crop material having expected property/properties toward the flighting. In the illustrated embodiment, each lug 302 has the same profile. However, in other embodiments, at least two lugs may have different profiles.

Furthermore, as discussed in detail below, each lug 302 may be oriented at any suitable angle relative to the radial axis 22. For example, at least one lug may be angled radially outwardly from the shaft, and/or at least one lug may be angled radially inwardly from the shaft. The orientation of each lug relative to the radial axis may be particularly selected to effectively move crop material having expected property/properties toward the flighting. In addition, in certain embodiments, at least a portion of at least one lug may have a twisted/spiral configuration to facilitate moving the crop material toward the flighting. Furthermore, in certain embodiments, at least a portion of at least one lug may be angled in a circumferential direction.

Figure 4:
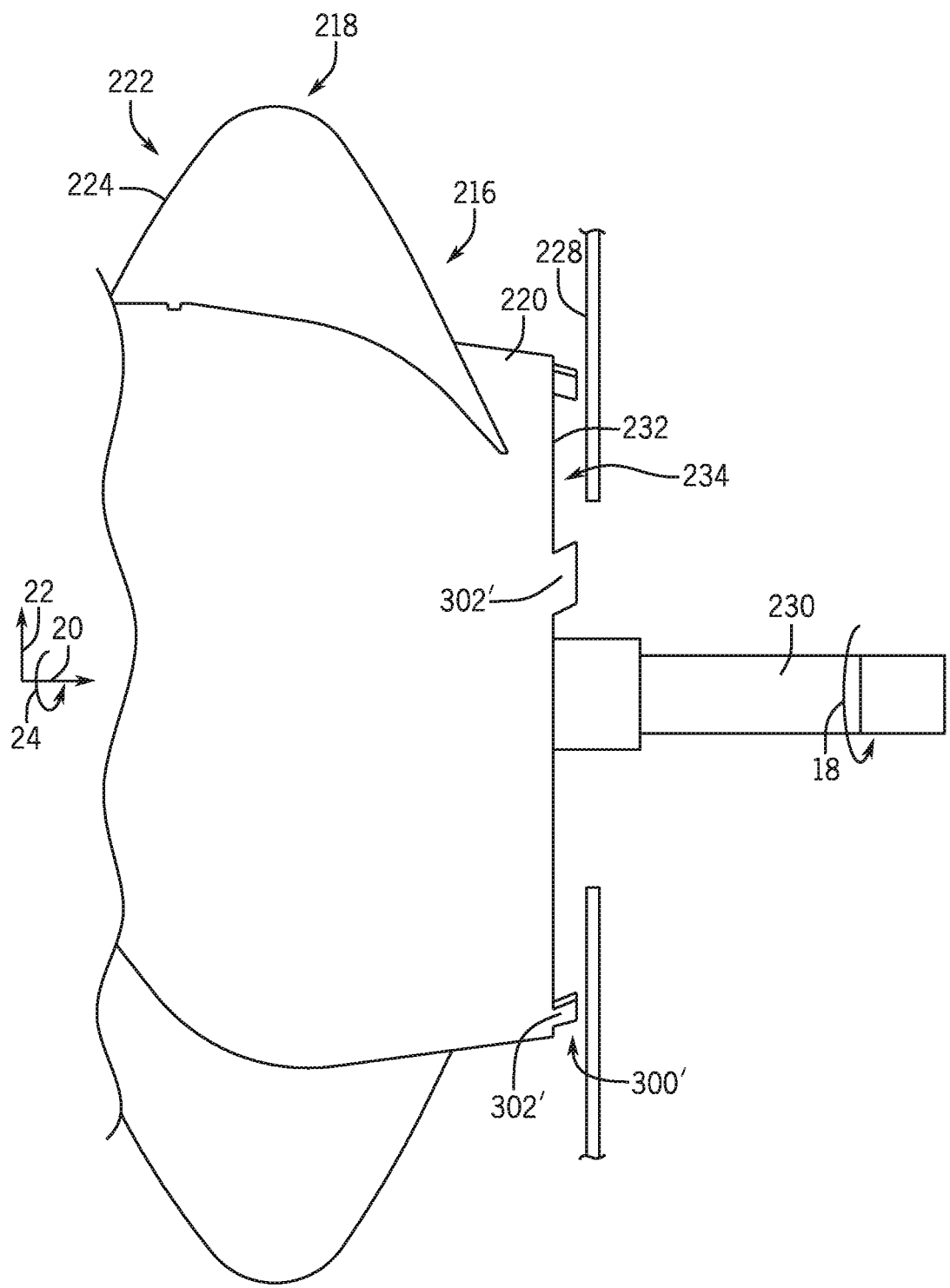
FIG. 4 is a front view of a portion of the auger of FIG. 3, in which the auger has another embodiment of a cleaning assembly.

FIG. 4 is a front view of a portion of the auger 216 of FIG. 3, in which the auger 216 has another embodiment of a cleaning assembly 300'. In the illustrated embodiment, the cleaning assembly 300' includes lugs 302' extending axially outwardly (e.g., with respect to the axial axis 20) beyond the axial end 232 of the shaft 220. The lugs 302' are distributed about a circumferential extent of the shaft 220 (e.g., about the shaft 220 with respect to the circumferential axis 24). The lugs 302' are configured to engage crop material positioned within the gap 234 and to move the crop material toward the flighting 222.

In the illustrated embodiment, the cleaning assembly 300' includes four lugs 302'. However, in other embodiments, the cleaning assembly may include more or fewer lugs (e.g., 1, 2, 3, 5, 6, 7, 8, or more). Furthermore, each lug 302' may have any suitable circumferential extent (e.g., extent with respect to the circumferential axis 24). In addition, in embodiments of the cleaning assembly having multiple lugs, any suitable circumferential spacing between the lugs may be employed. For example, the circumferential extent of each lug and/or the circumferential spacing between the lugs may be particularly selected to effectively move crop material having expected property/properties toward the flighting. The expected property/properties may include the type of crop material (e.g., based on the type of crops being harvested), the density of the crop material, the moisture content of the crop material, the thickness of the crop material, other suitable property/properties, or a combination thereof. Furthermore, the lugs 302' may have any suitable axial extent (e.g., extent with respect to the axial axis 20), thereby establishing a desired spacing between the lugs and the shield with respect to the axial axis. For example, the axial extent of each lug may be particularly selected to effectively move crop material having expected property/properties toward the flighting. In the illustrated embodiment, the circumferential extents of the lugs 302' are uniform (e.g., equal to one another), the circumferential spacings between the lugs 302' are uniform (e.g., equal to one another), and the axial extents of the lugs 302' are uniform (e.g., equal to one another). However, in other embodiments, at least two lugs may have different circumferential extents, at least two circumferential spacings between the lugs may be different, at least two lugs may have different axial extents, or a combination thereof.

In the illustrated embodiment, each lug 302' is integrally formed with the shaft 220. For example, the lugs 302' may be formed by a machining process, a casting process, an additive manufacturing process, or a combination thereof.

However, in other embodiments, at least one lug may be formed separately from the shaft and coupled to the shaft by a suitable connection. For example, at least one lug may be coupled to the shaft by a welded connection, an adhesive connection, a fastener connection, a press-fit connection, other suitable type(s) of connection(s), or a combination thereof. In addition, in the illustrated embodiment, each lug 302' extends from the axial end 232 of the shaft 220. However, in other embodiments, at least one lug may extend axially along a surface (e.g., an outer surface or an inner surface) of the shaft and outwardly beyond the axial end of the shaft. Furthermore, in the illustrated embodiment, each lug 302' is separate from the flighting 222 (e.g., not directly coupled to the flighting 222). However, in other embodiments, at least one lug may be coupled to/integrally formed with at least a portion of the flighting (e.g., in addition to or instead of the lug(s) coupled to/integrally formed with the shaft), and such lug(s) may extend axially outwardly (e.g., with respect to the axial axis) beyond the axial end of the shaft.

In the illustrated embodiment, each lug 302' has a rectangular profile. However, as discussed above, at least one lug may have a tapered profile (e.g., including an angled leading edge and/or an angled trailing edge), at least one lug may have a curved profile, at least one lug may have another suitable profile, or a combination thereof. The profile of each lug may be particularly selected to effectively move crop material having expected property/properties toward the flighting. In the illustrated embodiment, each lug 302' has the same profile. However, in other embodiments, at least two lugs may have different profiles.

Furthermore, in the illustrated embodiment, two lugs 302' are angled radially outwardly from the shaft 220, and two lugs 302' are angled radially inwardly from the shaft 220. Each lug 302' may be oriented at any suitable angle relative to the radial axis 22. The orientation of each lug 302' relative to the radial axis 22 may be particularly selected to effectively move crop material having expected property/properties toward the flighting 222. While two lugs 302' are angled radially outwardly from the shaft 220 and two lugs 302' are angled radially inwardly from the shaft 220 in the illustrated embodiment, in other embodiments, more or fewer lugs may be angled radially outwardly from the shaft (e.g., 0, 1, 3, 4, or more), and/or more or fewer lugs may be angled radially inwardly from the shaft (e.g., 0, 1, 3, 4, or more). In addition, in certain embodiments, at least a portion of at least one lug may have a twisted/spiral configuration to facilitate moving the crop material toward the flighting. Furthermore, in certain embodiments, at least a portion of at least one lug may be angled in a circumferential direction.

Figure 5:
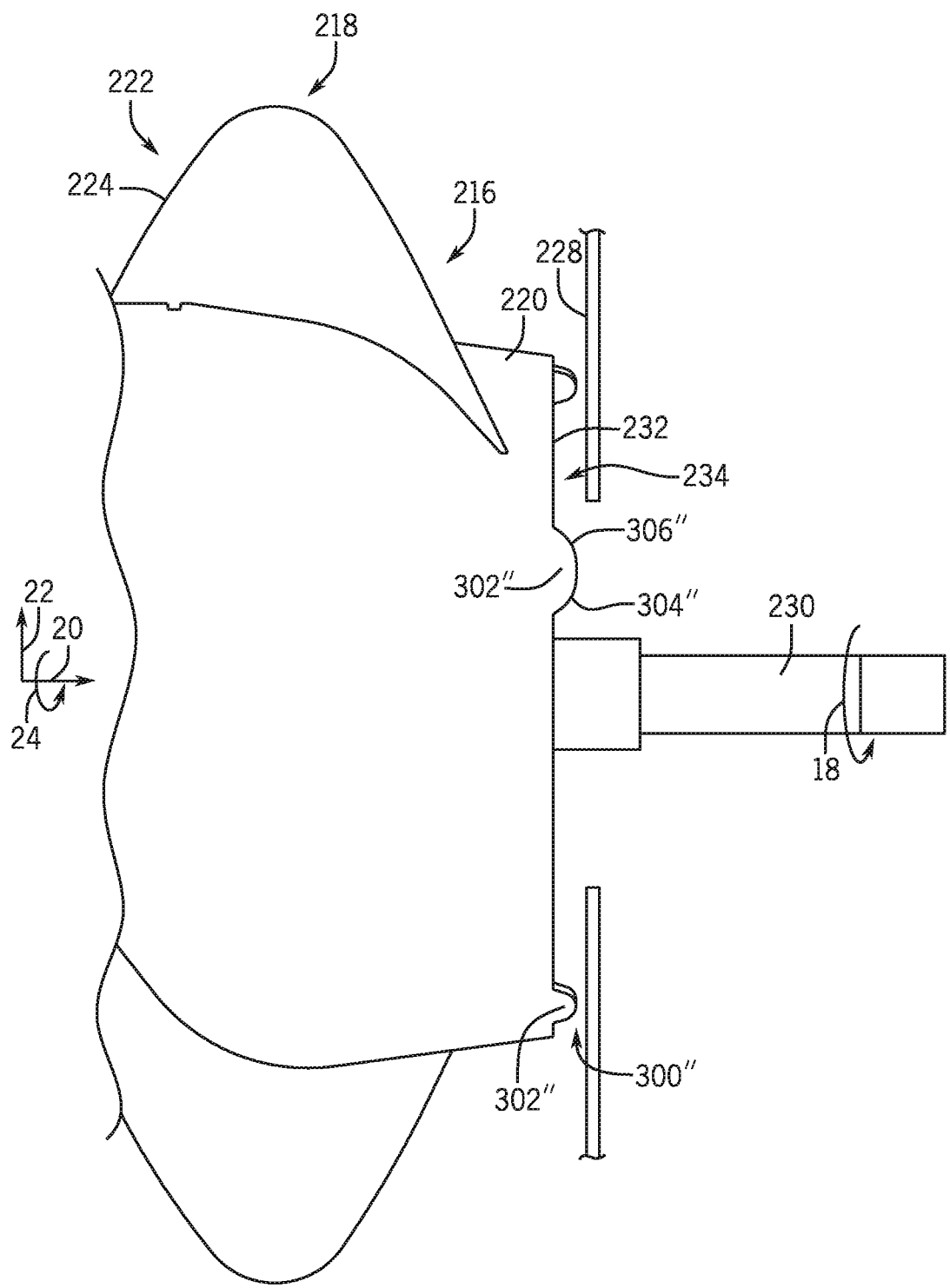
FIG. 5 is a front view of a portion of the auger of FIG. 3, in which the auger has a further embodiment of a cleaning assembly.

FIG. 5 is a front view of a portion of the auger 216 of FIG. 3, in which the auger has a further embodiment of a cleaning assembly 300". In the illustrated embodiment, the cleaning assembly 300" includes lugs 302" extending axially outwardly (e.g., with respect to the axial axis 20) beyond the axial end 232 of the shaft 220. The lugs 302" are distributed about a circumferential extent of the shaft 220 (e.g., about the shaft 220 with respect to the circumferential axis 24). The lugs 302" are configured to engage crop material positioned within the gap 234 and to move the crop material toward the flighting 222.

In the illustrated embodiment, the cleaning assembly 300" includes four lugs 302". However, in other embodiments, the cleaning assembly may include more or fewer lugs (e.g., 1, 2, 3, 5, 6, 7, 8, or more). Furthermore, each lug 302" may have any suitable circumferential extent (e.g., extent with respect to the circumferential axis 24). In addition, in embodiments of the cleaning assembly having multiple lugs, any suitable circumferential spacing between the lugs may be employed. For example, the circumferential extent of each lug and/or the circumferential spacing between the lugs may be particularly selected to effectively move crop material having expected property/properties toward the flighting. The expected property/properties may include the type of crop material (e.g., based on the type of crops being harvested), the density of the crop material, the moisture content of the crop material, the thickness of the crop material, other suitable property/properties, or a combination thereof. Furthermore, the lugs 302" may have any suitable axial extent (e.g., extent with respect to the axial axis 20), thereby establishing a desired spacing between the lugs and the shield with respect to the axial axis. For example, the axial extent of each lug may be particularly selected to effectively move crop material having expected property/properties toward the flighting. In the illustrated embodiment, the circumferential extents of the lugs 302" are uniform (e.g., equal to one another), the circumferential spacings between the lugs 302" are uniform (e.g., equal to one another), and the axial extents of the lugs 302" are uniform (e.g., equal to one another). However, in other embodiments, at least two lugs may have different circumferential extents, at least two circumferential spacings between the lugs may be different, at least two lugs may have different axial extents, or a combination thereof.

In the illustrated embodiment, each lug 302" is integrally formed with the shaft 220. For example, the lugs 302" may be formed by a machining process, a casting process, an additive manufacturing process, or a combination thereof. However, in other embodiments, at least one lug may be formed separately from the shaft and coupled to the shaft by a suitable connection. For example, at least one lug may be coupled to the shaft by a welded connection, an adhesive connection, a fastener connection, a press-fit connection, other suitable type(s) of connection(s), or a combination thereof. In addition, in the illustrated embodiment, each lug 302" extends from the axial end 232 of the shaft 220. However, in other embodiments, at least one lug may extend axially along a surface (e.g., an outer surface or an inner surface) of the shaft and outwardly beyond the axial end of the shaft. Furthermore, in the illustrated embodiment, each lug 302" is separate from the flighting 222 (e.g., not directly coupled to the flighting 222). However, in other embodiments, at least one lug may be coupled to/integrally formed with at least a portion of the flighting (e.g., in addition to or instead of the lug(s) coupled to/integrally formed with the shaft), and such lug(s) may extend axially outwardly (e.g., with respect to the axial axis) beyond the axial end of the shaft.

In the illustrated embodiment, each lug 302" has a curved profile. Furthermore, in the illustrated embodiment, the curved profile includes a curved leading edge 304" and a curved trailing edge 306". The leading edge 304" of each lug 302" may have any suitable radius of curvature, and the trailing edge 306" of each lug 302" may have any suitable radius of curvature. In the illustrated embodiment, the leading edge 304" and the trailing edge 306" of each lug 302" are convex. However, in other embodiments, with regard to at least one lug, the leading edge and/or the trailing edge may be concave. Furthermore, in certain embodiments, with regard to at least one lug, at least one of the leading edge or the trailing edge may not be curved (e.g., the edge may be parallel to the axial axis, or the edge may be angled relative to the axial axis). In certain embodiments, at least one lug may not have a curved profile. For example, at least one lug may have a tapered profile, at least one lug may have a rectangular profile, at least one lug may have another suitable profile, or a combination thereof. The profile of each lug may be particularly selected to effectively move crop material having expected property/properties toward the flighting. In the illustrated embodiment, each lug 302" has the same profile. However, in other embodiments, at least two lugs may have different profiles.

Furthermore, as previously discussed, each lug 302" may be oriented at any suitable angle relative to the radial axis 22. For example, at least one lug may be angled radially outwardly from the shaft, and/or at least one lug may be angled radially inwardly from the shaft. The orientation of each lug relative to the radial axis may be particularly selected to effectively move crop material having expected property/properties toward the flighting. In addition, in certain embodiments, at least a portion of at least one lug may have a twisted/spiral configuration to facilitate moving the crop material toward the flighting. Furthermore, in certain embodiments, at least a portion of at least one lug may be angled in a circumferential direction.

Figure 6:
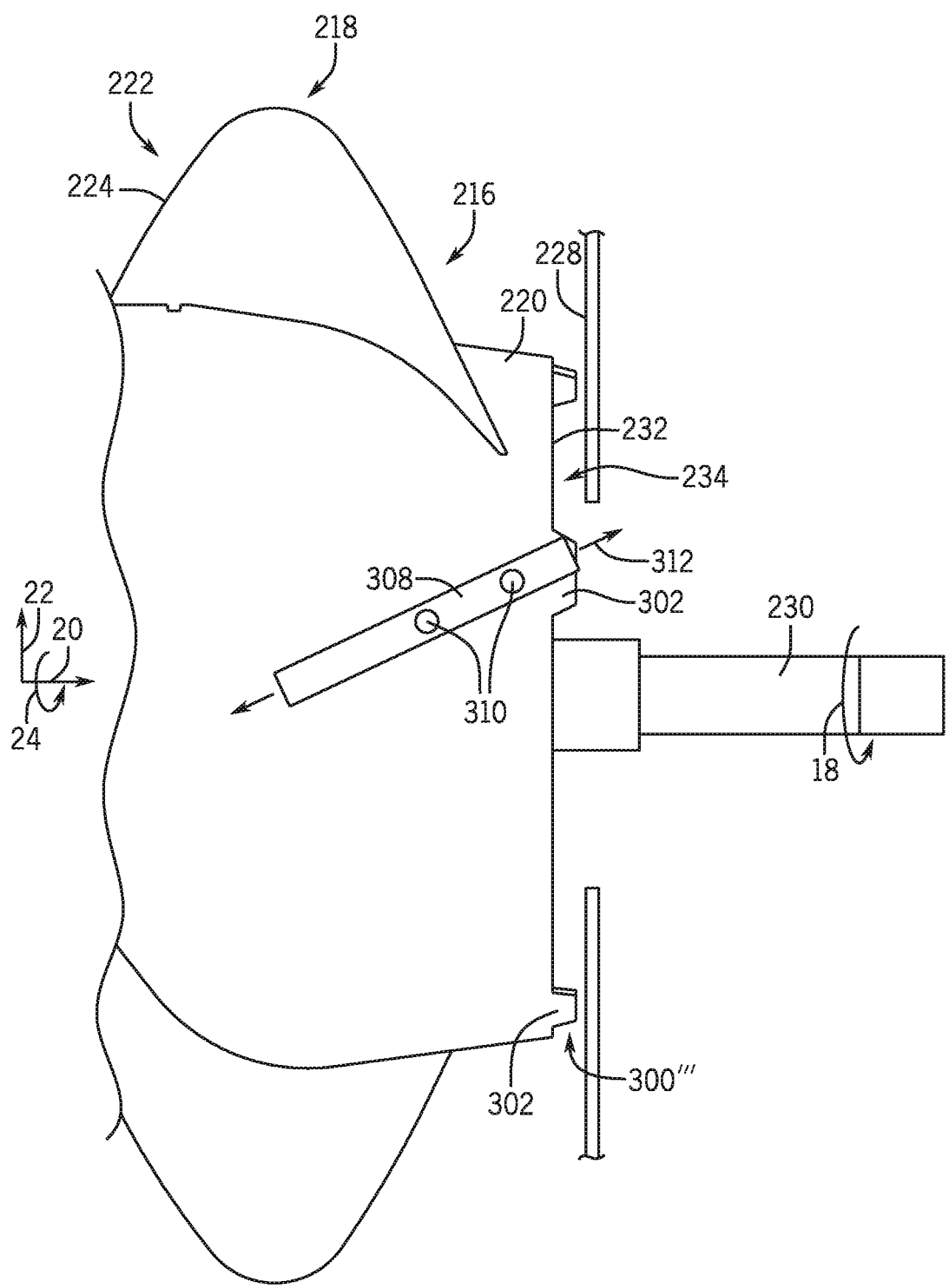
FIG. 6 is a front view of a portion of the auger of FIG. 3, in which the auger has an embodiment of a cleaning assembly.

FIG. 6 is a front view of a portion of the auger 216 of FIG. 3, in which the auger has an embodiment of a cleaning assembly 300'''. In the illustrated embodiment, the cleaning assembly 300''' has first lugs 302 corresponding to the lugs 302 disclosed above with regard to the cleaning assembly 300 of FIG. 3. In addition, the cleaning assembly 300'''' includes one or more movable lugs 308. Each movable lug 308 is configured to extend axially outwardly (e.g., with respect to the axial axis 20) beyond the axial end 232 of the shaft 220, and the movable lug(s) 308 are configured to engage crop material positioned within the gap 234 and to move the crop material toward the flighting 222.

Each movable lug 308 is movably coupled to the shaft 220 and configured to be axially movable (e.g., movable with respect to the axial axis 20) relative to the shaft 220. In the illustrated embodiment, the movable lug(s) 308 are coupled to the shaft 220 of the auger 216 via fastener(s) 310 (e.g., 1, 2, 3, 4, 5, 6, or more fasteners), such as bolt(s), screw(s), rivet(s), etc. In certain embodiments, the movable lug(s) may include multiple openings, and the position(s) of the movable lug(s) relative to the shaft may be adjusted by inserting the fastener(s) into respective opening(s). Additionally or alternatively, the shaft may include multiple openings, and the position(s) of the movable lug(s) relative to the shaft may be adjusted by inserting the fastener(s) into respective opening(s). Furthermore, in certain embodiments, the movable lug(s) may include slot(s), and the position(s) of the movable lug(s) relative to the shaft may be adjusted by sliding the movable lug(s) to desired position(s) and engaging (e.g., tightening, etc.) the fasteners. While the movable lug(s) 308 are movably coupled to the shaft 220 via fastener(s) 310 in the illustrated embodiment, in other embodiments, at least one movable lug may be movably coupled to the shaft by other suitable type(s) of connection(s) (e.g., slider, tongue and groove, etc.). In addition, while each movable lug 308 is positioned on an outer surface of the shaft 220 in the illustrated embodiment, in other embodiments, at least one movable lug may be positioned on an inner surface of the shaft.

Each movable lug 308 may be configured to move in any suitable direction relative to the shaft 220. For example, at least one movable lug may be configured to move along a path 312 angled relative to the axial axis 20, along the axial axis 20, or along the circumferential axis 24. Furthermore, in certain embodiments, at least one movable lug may be configured to move with respect to the radial axis 22. In addition, the movable lug may have any suitable shape, such as rectangular, circular, elliptical, irregular, etc. The position of each movable lug 308 may be adjusted based on the expected property/properties of the crop material. For example, the position of each movable lug 308 may be particularly adjusted to effectively move crop material having the expected property/properties toward the flighting. Accordingly, the movable lug(s) may be particularly configured for the particular harvesting operation. While the cleaning assembly 300''' includes both the first lugs 302 and the movable lug(s) 308 in the illustrated embodiment, in other embodiments, the first lugs may be omitted (e.g., the cleaning assembly may only include movable lug(s)).

Any of the lugs disclosed above with regard to FIGS. 3-6 may be used in any suitable combination within a cleaning assembly. For example, a cleaning assembly may include tapered lug(s), curved lug(s), movable lug(s), radially outwardly angled lug(s), radially inwardly angled lug(s), or any combination thereof. Furthermore, in embodiments in which the auger includes two cleaning assemblies, the cleaning assemblies may be the same as one another or different than one another.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cleaning assembly for an auger of an agricultural header, comprising:
at least one lug configured to extend axially outwardly beyond an axial end of a shaft of the auger, wherein the at least one lug is configured to engage crop material positioned between the axial end of the shaft and a shield and to move the crop material toward a flighting of the auger.

2. The cleaning assembly of claim 1, wherein the at least one lug comprises a plurality of lugs distributed about a circumferential extent of the shaft.

3. The cleaning assembly of claim 2, wherein a first lug of the plurality of lugs is configured to be angled radially outwardly from the shaft, and a second lug of the plurality of lugs is configured to be angled radially inwardly from the shaft.

4. The cleaning assembly of claim 1, wherein the at least one lug is configured to be angled radially outwardly from the shaft, or the at least one lug is configured to be angled radially inwardly from the shaft.

5. The cleaning assembly of claim 1, wherein the at least one lug has a curved profile or a tapered profile.

6. The cleaning assembly of claim 1, wherein the at least one lug is configured to extend axially outwardly from the axial end of the shaft.

7. The cleaning assembly of claim 1, wherein the at least one lug is configured to be movably coupled to the shaft, and the at least one lug is configured to be axially movable relative to the shaft.

8. An auger for an agricultural header, comprising:
a shaft;
a flighting extending radially outwardly from the shaft; and
a cleaning assembly, comprising:
at least one lug extending axially outwardly beyond an axial end of the shaft, wherein the at least one lug is configured to engage crop material positioned between the axial end of the shaft and a shield and to move the crop material toward the flighting.

9. The auger of claim 8, wherein the at least one lug comprises a plurality of lugs distributed about a circumferential extent of the shaft.

10. The auger of claim 9, wherein a first lug of the plurality of lugs is angled radially outwardly from the shaft, and a second lug of the plurality of lugs is angled radially inwardly from the shaft.

11. The auger of claim 8, wherein the at least one lug is angled radially outwardly from the shaft, or the at least one lug is angled radially inwardly from the shaft.

12. The auger of claim 8, wherein the at least one lug has a curved profile or a tapered profile.

13. The auger of claim 8, wherein the at least one lug extends axially outwardly from the axial end of the shaft.

14. The auger of claim 8, wherein the at least one lug is movably coupled to the shaft, and the at least one lug is axially movable relative to the shaft.

15. An agricultural header, comprising:
a shield configured to block movement of crop material; and
an auger, comprising:
a shaft;
a flighting extending radially outwardly from the shaft; and
a cleaning assembly, comprising:
at least one lug extending axially outwardly beyond an axial end of the shaft, wherein the at least one lug is configured to engage the crop material positioned between the axial end of the shaft and the shield and to move the crop material toward the flighting.

16. The agricultural header of claim 15, wherein the at least one lug comprises a plurality of lugs distributed about a circumferential extent of the shaft.

17. The agricultural header of claim 15, wherein the at least one lug is angled radially outwardly from the shaft, or the at least one lug is angled radially inwardly from the shaft.

18. The agricultural header of claim 15, wherein the at least one lug has a curved profile or a tapered profile.

19. The agricultural header of claim 15, wherein the at least one lug extends axially outwardly from the axial end of the shaft.

20. The agricultural header of claim 15, wherein the at least one lug is movably coupled to the shaft, and the at least one lug is axially movable relative to the shaft.

* * * * *